US005452421A

United States Patent [19]

Beardsley et al.

[11] Patent Number: 5,452,421
[45] Date of Patent: Sep. 19, 1995

[54] SYSTEM FOR USING REGISTER SETS AND STATE MACHINES SETS TO COMMUNICATE BETWEEN STORAGE CONTROLLER AND DEVICES BY USING FAILURE CONDITION ACTIVITY DEFINED IN A REQUEST

[75] Inventors: Brent C. Beardsley; Michael S. Porter; Adalberto G. Yanes, all of Tucson, Ariz.

[73] Assignee: International Business Machines Corporation, Armonk, N.Y.

[21] Appl. No.: 949,666

[22] Filed: Sep. 23, 1992

[51] Int. Cl.6 .................... G06F 13/12; G06F 13/14
[52] U.S. Cl. ..................... 395/182.02; 395/200.01; 371/30; 364/261.2; 364/266.5; 364/228.5; 364/DIG. 1
[58] Field of Search ............ 395/375, 575, 275; 371/2.1, 4, 30

[56] References Cited

U.S. PATENT DOCUMENTS

| | | | |
|---|---|---|---|
| 4,004,277 | 11/1977 | Gavril | 340/172.5 |
| 4,047,157 | 9/1977 | Jenkins | 364/900 |
| 4,207,609 | 6/1980 | Luiz et al. | 364/200 |
| 4,313,160 | 1/1982 | Kaufman | 364/260 |
| 4,636,946 | 2/1982 | Hartung et al. | 364/200 |
| 4,970,640 | 11/1990 | Beardsley et al. | 364/200 |
| 5,161,186 | 11/1992 | Doleu et al. | 380/2 |
| 5,201,053 | 4/1993 | Benhase et al. | 395/725 |
| 5,214,779 | 5/1993 | Barker et al. | 395/600 |

FOREIGN PATENT DOCUMENTS 63-147254  6/1988  Japan.
02090313  3/1990  Japan.

Primary Examiner—Thomas C. Lee
Assistant Examiner—Le H. Luu
Attorney, Agent, or Firm—H. St. Julian; Lisa L. B. Yociss; Andrew J. Dillon

[57] ABSTRACT

A method and system for improved communication in a data processing system. The data processing system includes at least one host and a storage subsystem having storage subsystem devices and at least one storage subsystem controller. The storage subsystem controller includes paths coupling the storage subsystem controller to storage subsystem devices. Communication is initiated between the storage subsystem controller and a selected storage subsystem device in response to a receipt of a request for communication. The request for communication specifies a predetermined path and a specified activity in response to a failure condition. A specified activity is automatically selected in response to a failure to achieve communication utilizing the predetermined path.

8 Claims, 4 Drawing Sheets

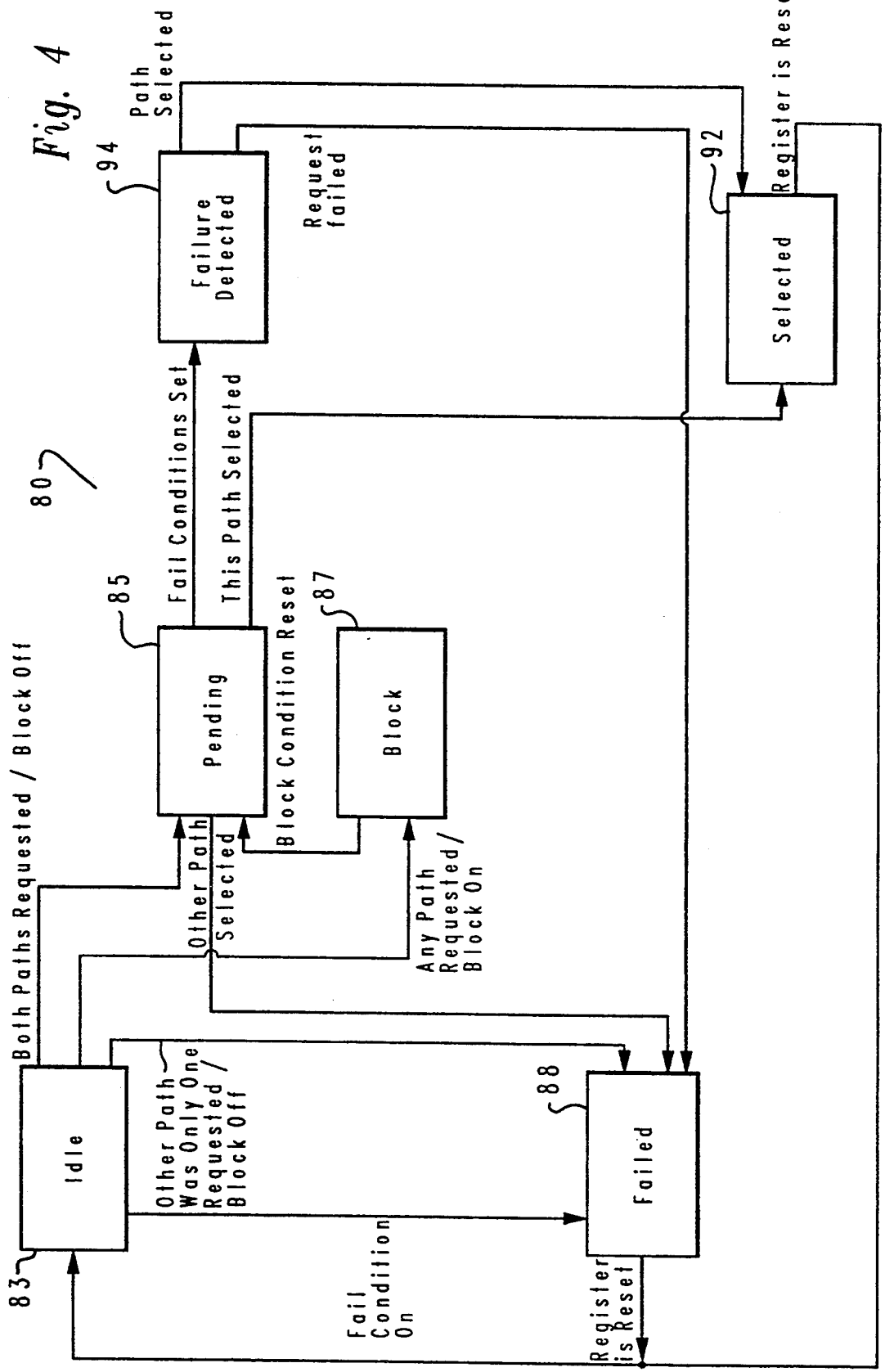

SYSTEM FOR USING REGISTER SETS AND STATE MACHINES SETS TO COMMUNICATE BETWEEN STORAGE CONTROLLER AND DEVICES BY USING FAILURE CONDITION ACTIVITY DEFINED IN A REQUEST

BACKGROUND OF THE INVENTION

1. Technical Field

The present invention relates in general to a method and system for improved communication in a data processing system including a host, storage subsystem controller, and storage subsystem devices and in particular to a method and system for the initiation of communication between a storage subsystem controller and storage subsystem devices in response to a receipt of a request for communication from a host. Still more particularly, the present invention relates to a method and system for the automatic selection of a specified activity set forth within a request for communication from a host within a data processing system.

2. Description of the Related Art

Main frame computer systems generally use auxiliary storage devices for mass storage of data. In auxiliary storage devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD), are one type of auxiliary storage device. In a direct access storage device access time to data is independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage controller is logically positioned between the DASDs and the host computers. The storage controller handles connection and disconnection between a particular computer and magnetic disk unit for transfer of data.

The IBM 3990 storage controller is an example of a storage controller used to control connections between magnetic disk units and host computers. The IBM 3990 Model 3 type controller, which is available from IBM Corporation, can handle up to sixteen channels from host computers and up to sixty-four magnetic storage units. Within the storage controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an 8×2 switch.

Channels are physical links between the storage controller and the host computers. Usually, a host computer has two or four channels, half being physically connected to the one multipath storage director and the other haft being connected to the other multipath storage director. Each storage path is connected to all of the available magnetic disk units. Upon indication that a disk is ready, the controller can secure any one of a plurality of the channels and storage paths back to a host to establish a data path. It is a feature of the IBM 3990 storage controller that an input/output transaction between a host computer and a magnetic disk unit may be broken into two separate connections, which may be handled along distinct channels and storage paths. A request need not be responded to over the same channel on which it was received. This feature increases throughput through the storage controller, because during the disconnect period the storage controller handles other tasks, such as a connection for another computer with another DASD.

In known systems a host might send a request to permit communication with a storage subsystem device. To satisfy the request the storage subsystem controller must select a path in order to permit communication between a host and a storage subsystem device. If the requested path is busy, the controller must detect the busy state, and request the other path, wait until the first path is no longer busy, or indicate to the host that the request to permit communication has failed. In addition, if a path has been selected, the controller may not request that path again until the path is free.

It should therefore be apparent that a need exists for a method and system for improving communication by permitting an automatic selection of paths while permitting a storage subsystem controller to perform other processing.

SUMMARY OF THE INVENTION

It is therefore one object of the present invention to provide an 4 improved method and system for improved communication in a data processing system including a host, storage subsystem controller, and storage subsystem devices.

It is another object of the present invention to provide an improved method and system for the initiation of communication between a storage subsystem controller and storage subsystem devices in response to a receipt of a request for communication from a host within a data processing system.

It is yet another object of the present invention to provide an improved method and system for the automatic selection of a specified activity set forth within a request for communication from a host within a data processing system.

The foregoing objects are achieved as is now described. A method and system for improved communication in a data processing system. The data processing system includes at least one host and a storage subsystem having storage subsystem devices and at least one storage subsystem controller. The storage subsystem controller includes paths coupling the storage subsystem controller to storage subsystem devices. Communication is initiated between the storage subsystem controller and a selected storage subsystem device in response to a receipt of a request for communication. The request for communication specifies a predetermined path and a specified activity in response to a failure condition. A specified activity is automatically selected in response to a failure to achieve communication utilizing the predetermined path.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a state machine from the storage subsystem controller of FIG. 3 in accordance with the present invention.

DETAILED DESCRIPTION OF PREFERRED EMBODIMENT

Figure 1:
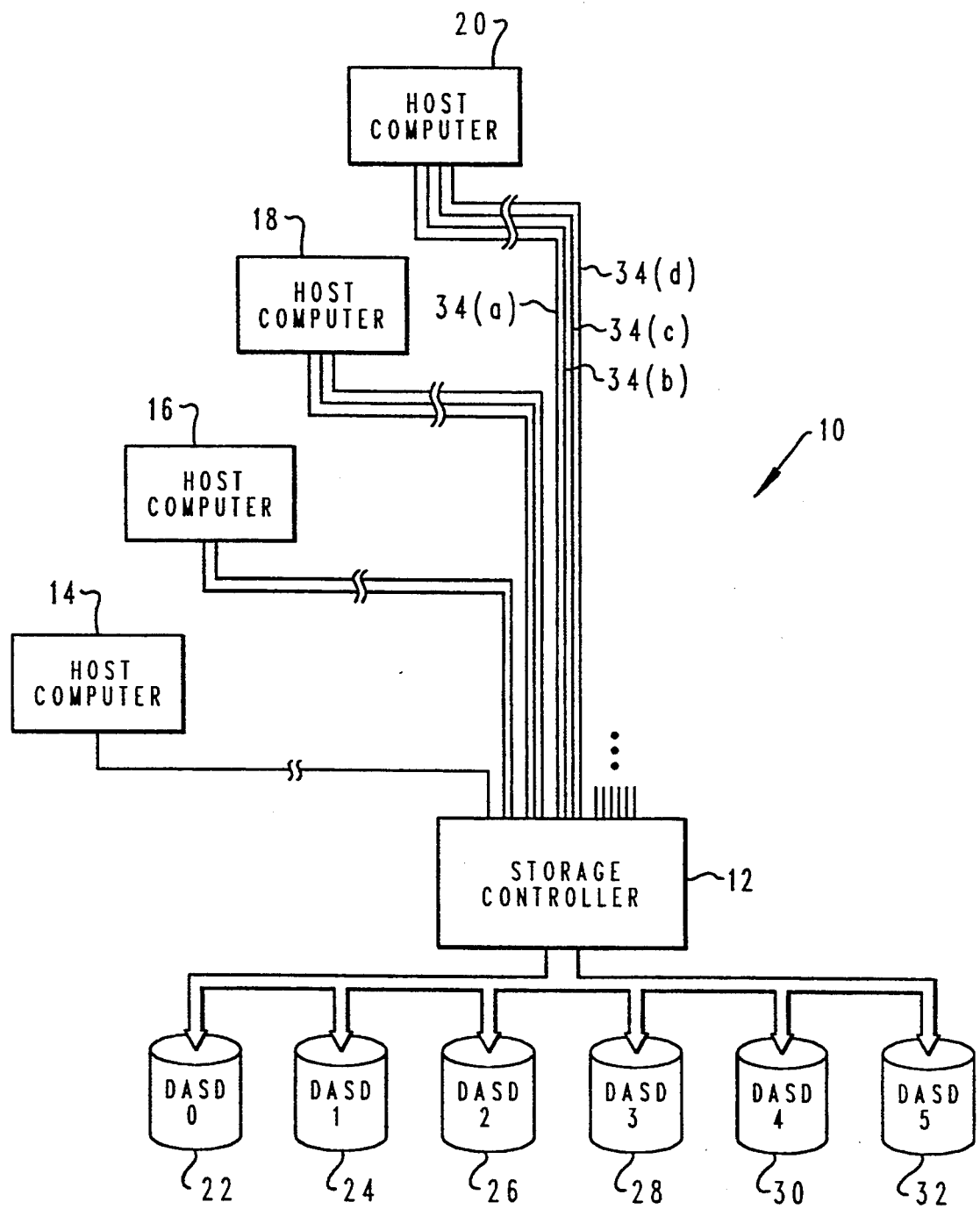
FIG. 1 depicts a pictorial representation of a data processing system which may be utilized to implement the method and system of the present invention.

With reference now to the figures and in particular with reference to FIG. 1, there is depicted a high level block diagram of a data processing system 10. Data processing system 10 includes a storage subsystem controller 12, a plurality of host computers 14, 16, 18 and 20 and a plurality of storage subsystem devices 22–32. Storage subsystem devices 22–32 are generally magnetic storage units, such as disk drives. Storage subsystem devices 22–32 are also connected to storage subsystem controller 12 for selective connection for communication with host computers. Storage subsystem controller 12 is preferably an IBM 3990 Model 3 type controller, which is available from IBM Corporation. Host computers 14–20 are typically main frame systems such as the IBM 3090, the ES9000 Model computer, or comparable systems. Host computers 14–20 are connected to storage subsystem controller 12 with at least one and up to four channels. For example, host computer 20 is connected to storage subsystem controller 12 by channels 34(a), 34(b), 34(c) and 34(d). The channels come in two types, parallel data channels and serial data channels. Certain optical serial channels are used for data transmission up to 15 kilometers. Parallel channels utilize electrical signals and are generally not used at distances of greater than about 125 meters.

Figure 2:
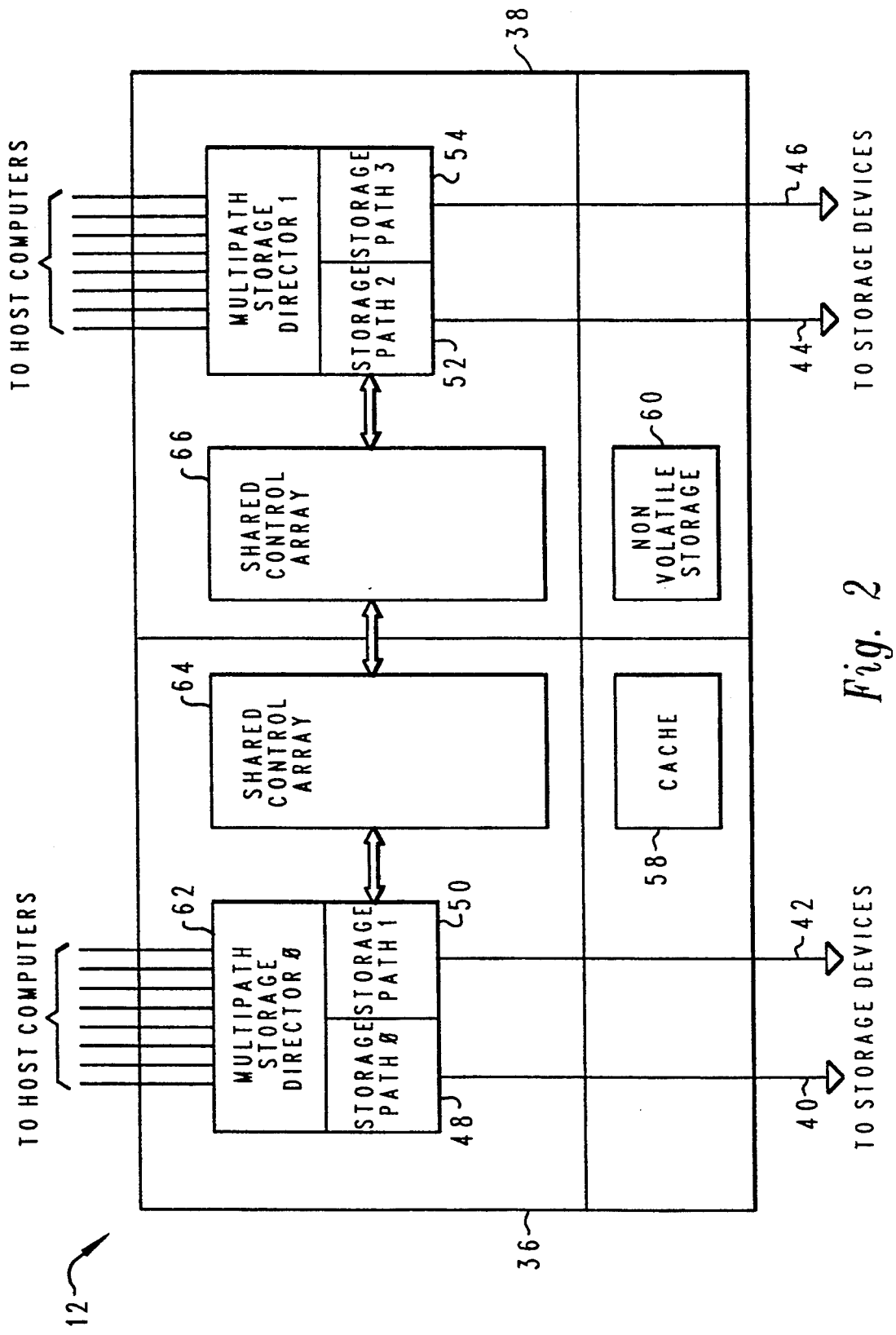
FIG. 2 illustrates a block diagram of a storage subsystem controller from the data processing system of FIG. 1 in accordance with the present invention.

FIG. 2 depicts storage subsystem controller 12 in greater detail. Storage subsystem controller 12 has two storage clusters 36 and 38, each of which provides for selective connection between a host computer and a storage subsystem device. Although four host computer systems and six storage subsystem devices are depicted in FIG. 1, storage subsystem controller 12 can handle additional channels and storage subsystem devices.

Data from a given host computer system may be stored to any of the storage subsystem devices. Data may also be recovered from any of the storage subsystem devices for a given host computer. Where a host computer is connected by at least two channels, one each is connected to storage clusters 36 and 38. Similarly, where four channels are provided, two are connected to storage cluster 36 and two to the second storage cluster 38. Storage subsystem controller 12 may receive a request from a host computer over a channel, and respond to the request over any one of the channels connected to the same host computer. The channels associated with one host computer are known as a path group. Storage subsystem controller 12 has knowledge of the path groups, having received it from each host computer.

Storage subsystem controller 12 has four paths 40, 42, 44 and 46 to the storage subsystem devices. Each data path 40–46 is associated with one of storage path processors 48–54, respectively. Each data path goes to all of the storage subsystem devices. Only one data path has access to a storage subsystem device at a time however. Because storage subsystem controller 12 attempts to synchronize disconnects and reconnects between storage subsystem devices and host computers based upon rotational position of a disk in the storage subsystem device, storage subsystem controller 12 may be seen to operate, in essence, as a data transfer traffic manager. An objective of the traffic management scheme is to respond to requests received over the channels to the host computers as quickly as possible. One way to meet this objective is to keep the storage path processors occupied with data moving between host computers and storage subsystem devices.

Figure 3:
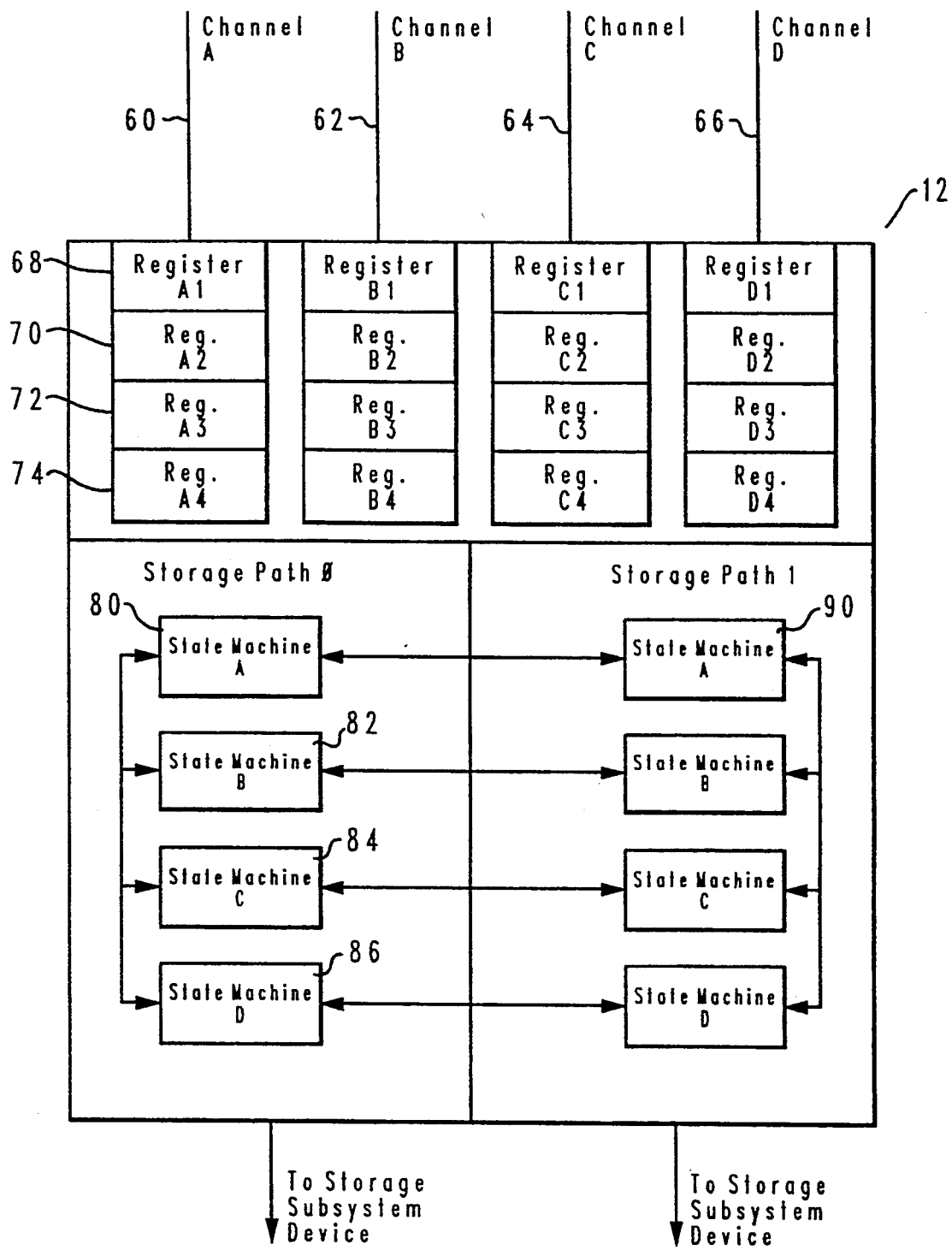
FIG. 3 depicts a block diagram of a storage subsystem controller having registers and state machines in accordance with the present invention.

With reference now to FIG. 3, there is depicted a storage subsystem controller having registers and state machines in accordance with the present invention. A host computer may send a request for communication with a storage subsystem device via a Channel A 60, Channel B 62, Channel C 64, or Channel D 66. Each channel has an associated set of four registers. For example, Channel A 60 has associated Register A1 68, Register A2 70, Register A3 72, and Register A4 74. The four registers associated with Channel A 60 are similar to the four registers associated with all other channels.

In order for a request to be satisfied a path must be available between a channel and a storage subsystem device. Both a physical and logical path must be available. When a request is made, it includes both a request for a physical path, such as a storage path 0, as well as a logical path. Logical paths are the logical relationships that exist between channels and storage subsystem controllers and are shared between storage path 0 and storage path 1. Even though a physical path may be available to satisfy a request, a logical path may not be available. When requests are made for logical paths that are not available, these requests are blocked.

Each storage path has an associated set of state machines which correspond to the channels. For example, storage path 0 has state machine A 80 corresponding to channel A 60, state machine B 82 corresponding to Channel B 62, state machine C 84 corresponding to Channel C 64, and state machine D 86 corresponding to Channel D 66. Storage path 1 has a similar set of state machines. The state machines may communicate with each other as depicted and will change states as a result of the state of the other state machines. All state machines are identical and are described below in more detail in FIG. 4.

Register A1 68 is utilized to indicate what requests and conditions have been received via Channel A 60. Register A1 68 may indicate a request to permit communication utilizing one or both paths, a condition that the request should hold if a request is already pending, or a condition that the request should fail if the requested path is already selected. Register A1 68 can be programmed to set any condition desired. In addition, Register A1 68 may contain a priority level for each request. Higher priority requests will be processed first while lower priority requests remain pending. If a low priority request has not been processed and a higher priority request is made, the higher priority request will be processed first.

Register A2 70 is utilized to indicate the status of the storage paths. For example, if storage path 0 is already selected by Channel B 62 and storage path 1 is available, register A2 70 will indicate this. Register A3 72 indicates which state, state machine A is in and may indicate a cause of failure. Register A4 74 may be utilized to indicate that logical paths are unavailable.

In order to improve the efficiency of communication, Channel A 60 and Channel C 64 have an affinity to storage path 0, and Channel B 62 and Channel D 64 have an affinity to storage path 1. In this manner, when a request is received via Channel A 60 to initiate communication utilizing either storage path 0 or storage path 1, storage subsystem controller 12 attempts first to initiate communication utilizing storage path 0. If storage path 0 is unavailable, storage subsystem controller 12 will then attempt to initiate communication utilizing storage path 1. State machine 80 will indicate its status to state machine 90 which will then change states as a result of the status of state machine 80.

Referring now to FIG. 4, there is depicted a state machine 80 from the storage subsystem controller of FIG. 3 in accordance with the present invention. Since each state machine A–D for both storage path 0 and storage path 1 are identical, state machine 80 could represent any one of them. For purposes of this example, however, state machine 80 represents the state machine corresponding to Channel A 60 in storage path 0. State machine 80 starts in block 83 in the Idle state and remains in Idle until a request is detected. State machine 80 detects a request utilizing Register A1 68. If both paths have been requested and no block conditions exist for the requested logical path, state machine 80 changes from the Idle state to Pending state as illustrated by block 85. Referring back to block 83, if a block condition exists when any path is selected, state machine 80 transitions from Idle to the Block state depicted by block 87.

Referring again to block 83, if no block conditions exist and storage path 1 was requested, state machine 80 which is in storage path 0, transitions from Idle to the Failed state illustrated by block 88. It should be apparent that all state machines are operating concurrently. Therefore, if no block conditions exist and storage path 1 was requested, state machine 80 will transition from Idle to Failed and state machine 90 in storage path 1 will concurrently transition from Idle to Pending.

Referring back to the Failed state depicted by block 83, if when a request is received a failure condition exists, state machine 80 will transition from Idle to Failed. State machine 80 remains in the Failed state until a reset signal is received. The reset signal will reset Register A1 68 which will be detected by Register A3 72. When a reset is received, state machine 80 changes from the Failed state back to the Idle state.

Referring again to the Pending state illustrated by block 85, if storage path 0 is selected, state machine 80 which is in storage path 0, will transition from the Pending state to the Selected state depicted by block 92. State machine 90 will go to the failed state after communication from path 0 is selected. State machine 80 will remain in the selected state until a Register A1 68 is reset. In response to Register A1 68 being reset, state machine 80 will change from the Selected state back to the Idle state.

If during the transition from Idle to Pending a failure condition was set, state machine 80 will transition from Pending to a Failure Detected state depicted by block 94. State machine 80 will remain in the Failure Detected state for a predetermined period of time. During this time, if the requested path is selected, state machine 80 will change from the Failure Detected state to the Selected state. If, however, the request fails during the predetermined period of time, state machine 80 will transition from the Failure Detected state to the Failed state.

Referring again to the Pending state illustrated by block 85, if storage path 1 was selected and therefore storage path 0 was not, state machine 80 transitions from the Pending state to the Failed state depicted by block 88. Referring again to the Block state illustrated by block 87, state machine 80 will remain in the Block state until the block condition is reset. When the block condition is reset, state machine 80 will transition from the Block state depicted by block 87 to the Pending state depicted by block 85.

While the invention has been particularly shown and described with reference to a preferred embodiment, it will be understood by those skilled in the art that various changes in form and detail may be made therein without departing from the spirit and scope of the invention.

We claim:

1. A method for improved communication in a data processing system having at least one host and a storage subsystem including a plurality of storage subsystem devices and at least one storage subsystem controller, wherein said least one host coupling to said storage subsystem controller via a plurality of channels, said at least one storage subsystem controller includes a plurality of paths coupling said at least one storage subsystem controller to said plurality of storage subsystem devices, and wherein said least one storage subsystem controller includes a plurality of sets of registers and a plurality of sets of states machines, each of said channels has a corresponding set of registers, each of said paths has a corresponding set of said state machines, each said set of registers together storing information related to said plurality of paths and current state of one of said state machines, said method comprising the data processing system implemented steps of:

initiating communication between said at least one storage subsystem controller and a selected one of said plurality of storage subsystem devices in response to a receipt of a request for communication from said at least one host, said request for communication specifying a predetermined one of said plurality of paths and a specified activity to be undertaken in response to each of a plurality of failure conditions, storing additional information related to said request in one of said register sets, and utilizing said information and said additional information stored in said plurality of register sets in association with said plurality of state machines to automatically select a specified activity set forth within said request for communication in response to a failure to achieve communication utilizing said predetermined one of said plurality of paths, wherein said at least one host is not required to respond to failure conditions.

2. The method for improved communication in a data processing system having at least one host and a storage subsystem including a plurality of storage subsystem devices and at least one storage subsystem controller, wherein said at least one storage subsystem controller includes a plurality of paths coupling said at least one storage subsystem controller to said plurality of storage subsystem devices according to claim 1 wherein said specified activity within said request for communication comprises automatically holding said request for communication until said predetermined one of said plurality of paths is available and wherein said step of utilizing said information and said additional information to automatically select a specified activity comprises the step of holding said request for communication until said predetermined one of said plurality of paths is available in response to a failure to achieve communication.

3. The method for improved communication in a data processing system having at least one host and a storage subsystem including a plurality of storage subsystem devices and at least one storage subsystem controller, wherein said at least one storage subsystem controller includes a plurality of paths coupling said at least one storage subsystem controller to said plurality of storage subsystem devices according to claim 1 wherein at least one of said plurality of failure conditions comprise a determination that said predetermined one of said plurality of paths has already been selected.

4. The method for improved communication in a data processing system having at least one host and a storage subsystem including a plurality of storage subsystem devices and at least one storage subsystem controller according to claim 1 further comprising the step of prohibiting a receipt of a second request for communication from said at least one host while said predetermined one of said plurality of paths is being utilized in response to said receipt of said request.

5. A system for improved communication in a data processing system having at least one host and a storage subsystem including a plurality of storage subsystem devices and at least one storage subsystem controller, wherein said least one host coupling to said storage subsystem controller via a plurality of channels, said at least one storage subsystem controller includes a plurality of paths coupling said at least one storage subsystem controller to said plurality of storage subsystem devices, and wherein said least one storage subsystem controller includes a plurality of sets of registers and a plurality of sets of states machines, each of said channels has a corresponding set of registers, each of said paths has a corresponding set of said state machines, each said set of registers together storing information related to said plurality of paths and current state of one of said state machines, said method comprising the data processing system implemented steps of:

means for initiating communication between said at least one storage subsystem controller and a selected one of said plurality of storage subsystem devices in response to a receipt of a request for communication from said at least one host, said request for communication specifying a predetermined one of said plurality of paths and a specified activity to be undertaken in response to each of a plurality of failure conditions, means for storing additional information related to said request in one of said register sets, and means for utilizing said information and said additional information stored in said plurality of register sets in association with said plurality of state machines to automatically select a specified activity set forth within said request for communication in response to a failure to achieve communication utilizing said predetermined one of said plurality of paths, wherein said at least one host is not required to respond to failure conditions.

6. The system for improved communication in a data processing system having at least one host and a storage subsystem including a plurality of storage subsystem devices and at least one storage subsystem controller, wherein said at least one storage subsystem controller includes a plurality of paths coupling said at least one storage subsystem controller to said plurality of storage subsystem devices according to claim 5 wherein said specified activity within said request for communication comprises the means for automatically holding said request for communication until said predetermined one of said plurality of paths is available.

7. The system for improved communication in a data processing system having at least one host and a storage subsystem including a plurality of storage subsystem devices and at least one storage subsystem controller, wherein said at least one storage subsystem controller includes a plurality of paths coupling said at least one storage subsystem controller to said plurality of storage subsystem devices according to claim 5 wherein at least one of said plurality of failure conditions comprise a determination that said predetermined one of said plurality of paths has already been selected.

8. The system for improved communication in a data processing system having at least one host and a storage subsystem including a plurality of storage subsystem devices and at least one storage subsystem controller according to claim 5 further comprising means for prohibiting a receipt of a second request for communication from said at least one host while said predetermined one of said plurality of paths is being utilized in response to said receipt of said request.

* * * * *